April 2, 1963 L. K. CECIL ETAL 3,084,120
APPARATUS AND PROCESS FOR CONTINUOUS ION EXCHANGE
Filed July 18, 1955 3 Sheets-Sheet 1

April 2, 1963   L. K. CECIL ETAL   3,084,120
APPARATUS AND PROCESS FOR CONTINUOUS ION EXCHANGE
Filed July 18, 1955   3 Sheets-Sheet 3

�# United States Patent Office 3,084,120
Patented Apr. 2, 1963

3,084,120
APPARATUS AND PROCESS FOR CONTINUOUS ION EXCHANGE
Lawrence K. Cecil and Anton A. Kalinske, Tucson, Ariz., assignors to Infilco Incorporated, Tucson, Ariz., a corporation of Delaware
Filed July 18, 1955, Ser. No. 522,766
7 Claims. (Cl. 210—33)

This invention relates to an apparatus and a method for treating liquids or slurries by ion exchange, and in particular to an apparatus and process for continuous ion exchange.

Both liquids and slurries will hereinafter be referred to sometimes as "liquids."

It is an object of this invention to provide an improved ion exchange plant wherein treatment and regeneration are carried out continuously.

Another object of the invention is to provide a continuous method of ion exchange treatment.

Another object is to provide in an ion exchange plant improved utilization of the exchange capacity of the ion exchange material.

Another object is to provide means whereby the contact time between the liquid to be treated and the ion exchange material is prolonged without increasing the quantity of ion exchange material.

Another object is to provide means for thoroughly mixing a granular ion exchange material with the liquid to be treated and for circulating the resulting mixture while avoiding attrition of the treating material.

Another object is to provide a pneumatically operated ion exchange plant wherein air under pressure is used to effect mixing of liquid to be treated with exchange material, circulation of the mixture, and transfer of exchange material to a regeneration zone.

Another object is to provide air-operated apparatus for regeneration of ion exchange material and for rinsing of the regenerated exchange material.

Another object of the invention is to provide in an ion exchange plant including a plurality of sequentially arranged treating units, through which the liquid to be treated and the treating material pass counter-currently, for transfer of the treating material by air lift from unit to unit and for its withdrawal by air lift to, and its return by air lift from, a regeneration zone.

Other objects will become apparent from a consideration of the detailed description and of the claims which follow.

The word "air" is used herein to denote any gas suitable for the process; similarly, the term "gas" is intended to denote any suitable gas, including air.

In the treatment of liquid by ion exchange, it is usual to flow the liquid to be treated through a bed of suitable ion exchange material, the direction of flow ordinarily being downward, but sometimes also upward. When the material becomes exhausted, the flow is interrupted, and the material is backwashed to loosen the bed and free it from dirt and other foreign material filtered out by it; then the bed is regenerated with a suitable regenerant and thereafter rinsed.

This method of operation has various objections. In the first place, if a continuous supply of treated water is required, standby equipment must be provided which is available for operation during regeneration of another unit or units. In view of this drawback, attempts, dating back several decades, have been made to provide ion exchangers operating on a continuous basis. All these structures of the prior art have one thing in common: the bed of exchange material is gradually renewed by continuously withdrawing material either from the bottom or from the top and introducing freshly regenerated material either at the top or at the bottom, respectively. The withdrawn material is regenerated either in the same or in a separate container.

While these methods avoid the interruption of the operation for regeneration, they do not overcome a second and most important drawback inherent in all percolation of liquid through ion exchange beds. Merely flowing the liquid to be treated through a bed of material, whether or not the bed itself moves countercurrently to the liquid flow, does not afford the most efficient contact between the liquid and the material. When the flow rate is high, the contact is short, and to prolong it a deeper bed must be used. On the other hand, when decreasing the flow rate uniform distribution becomes more difficult, and the bed may not be equally utilized in all parts. Most important, however, the ion exchange capacity of each individual particle or bead of exchange material is not fully utilized by the liquid passing by and between the particles of a bed.

We have found that when the particles of ion exchange material are thoroughly mixed with the liquid to be treated and the mixture is agitated and circulated for a period of time in a treating zone, before the liquid is separated from the exchange material, a much higher utilization of the exchange capacity of the ion exchange material is realized, and consequently a much smaller quantity of exchange material is needed for obtaining the same results than when percolating the liquid through ion exchange beds.

However, in operating in this manner great care must be taken to avoid attrition of the granular material. We have found that pumps, impellers, and the like cannot be used for handling the material, but that mixing and circulation must be effected in a much more gentle manner, while still holding the ion exchange material in suspension in the liquid. We have solved this problem of attrition by using air under pressure for mixing and circulation, as well as for conveying of the ion exchange material from one zone to another.

The invention will be more readily understood by reference to the drawings, wherein like reference characters designate similar elements and wherein.

Figure 1:
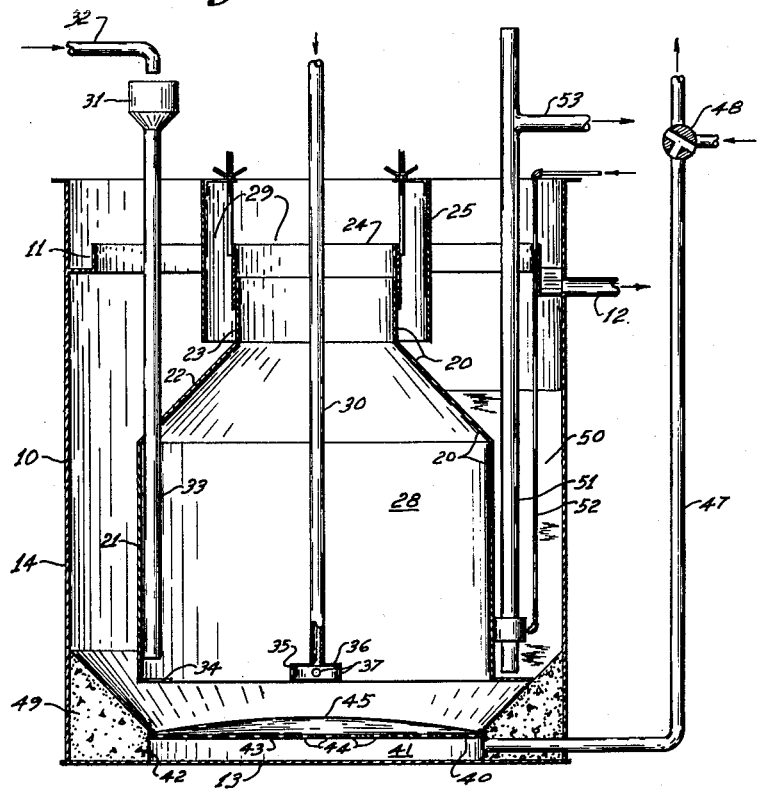
FIGURE 1 is a vertical cross sectional view of an ion exchange unit according to the invention.

The ion exchange unit of FIGURE 1 comprises a tank 10 of suitable configuration, such as cylindrical or square, provided with an outlet launder 11 for treated liquid, from which an effluent conduit 12 leads. As shown, the tank has a substantially flat bottom 13 and an upstanding side wall 14. Axially aligned in the tank 10 is a partition structure 20, which is supported by any suitable means, not shown, in spaced relationship to the bottom of the tank and extends to an elevation below the overflow edge of the launder 11. The partition structure 20 includes a lower portion 21, which may be cylindrical or square, an intermediate inwardly and upwardly sloping portion 22, and an upper cylindrical or square portion 23. The upper portion 23 is preferably fitted with an adjustable sleeve 24, providing a variable overflow. An outer partition 25 surrounds the upper portion 23 and extends upwardly to an elevation above the overflow edge of the outlet launder 11. The partition structure 20 and the partition 25 provide in the tank 10 a treating chamber 28 in the lower portion 21 of partition structure 20 and a passageway 29 for a circulation from the upper portion of chamber 28 upwardly through the intermediate and upper portions 22 and 23 of partition structure 20 and downwardly between the partition structure and outer partition, and through the outer tank back into chamber 28 through its open bottom.

Liquid or slurry to be treated by ion exchange is introduced into the treating chamber 28 within the lower portion 21 by any suitable mans, such as the inlet conduit 30. A slurry of the treating material is introduced into the treating chamber 28 by any suitable means. As shown, the slurry is discharged into a funnel 31 through a pipe 32 leading from a supply of the slurried material, not shown, and a conduit 33 leads from the funnel to the lower portion of the chamber 28. Preferably, the conduit 33 discharges against a baffle 34, shown in the drawing as extending inwardly from the lower edge of the partition structure 20. The inlet conduit 30 may discharge into the chamber 28 through a deflecting member 35, comprising a casing 36 with lateral discharge openings 37.

Figure 2:
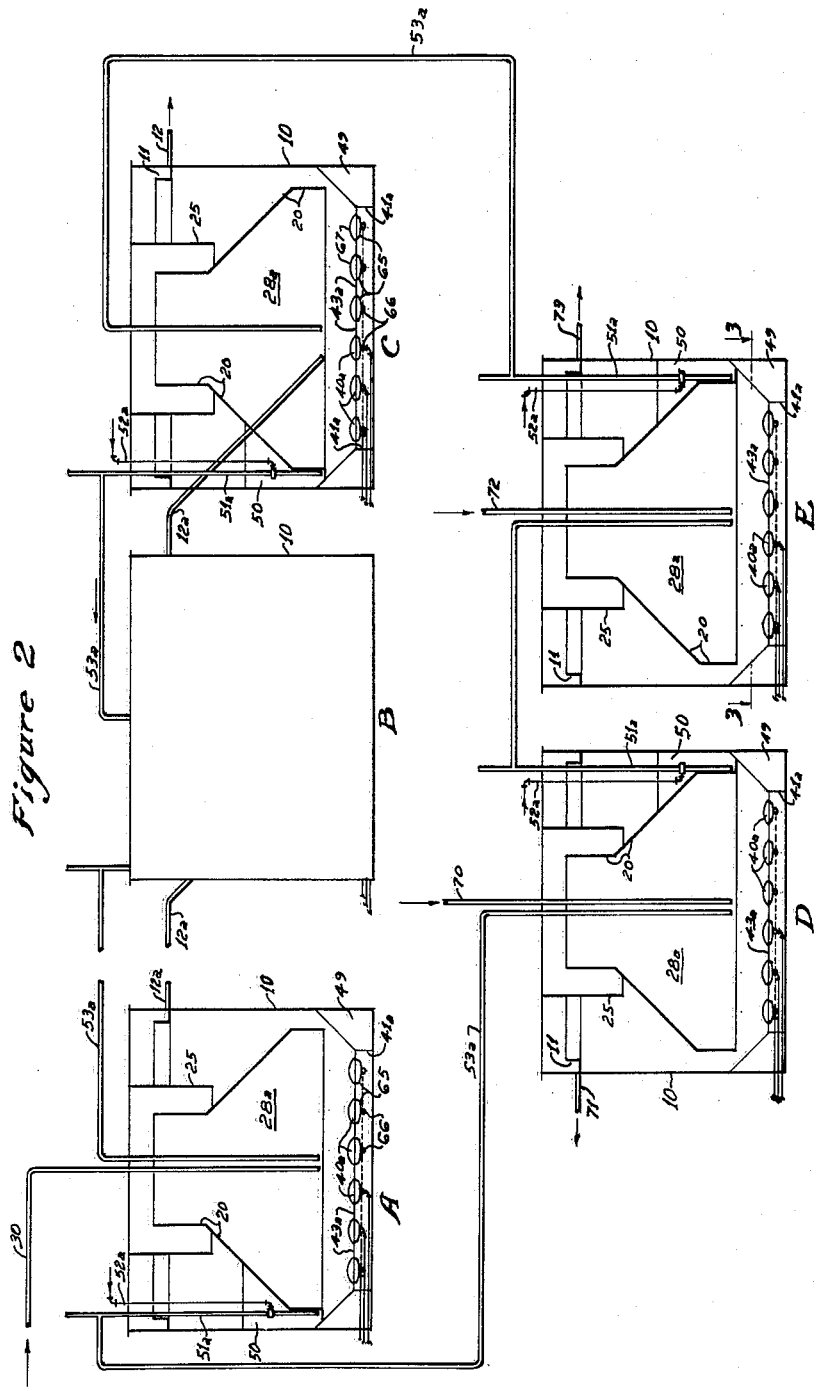
FIGURE 2 is a vertical sectional view partly in elevation of a multi-stage ion exchange plant according to the invention.

Air diffusion means are mounted underneath the open bottom of the lower cylindrical portion 21. These may take various forms, such as series of diffusers, arranged as shown in FIGURE 2. In a relatively small tank a single diffusion element 40 can be used, as shown in FIGURE 1. The diffuser 40 comprises a casing 41, including a peripheral wall 42 mounted on, and extending upwardly from, the floor of the tank 10 and having a size and shape substantially corresponding to the size and shape of the lower portion 21 of the partition structure 20, and a top 43 comprising a plate with a plurality of perforations or slots 44. A sheet or cloth 45 of suitable flexible porous material is fixed to the peripheral wall 42. In relatively small tanks the plate 43 can be omitted, but in larger tanks it provides a desirable support for the cloth when the gas pressure is cut off. The center portion of the sheet 45 may be blocked to the passage of air by any suitable means, not shown. If a deflecting member 35 is used, this is unnecessary, as the member 35 prevents the upflow of air in the center of chamber 28. Air or other gas under pressure from any suitable source is discharged into the casing through a conduit 47 and diffuses through the perforations 44 and the flexible cloth 45, which balloons out under the gas pressure. A three-way valve 48 on conduit 47 permits connecting the casing 41 to atmosphere, when it is desired to collapse the cloth 45 for cleaning purposes.

To prevent deposits in the spaces between the peripheral wall of the casing 41 and the wall of the tank 10, a fill 49 extends from the tank wall 14 to the casing wall 42. The angle of the fill is sufficiently steep that depositing material slides down to the diffuser 40, to be resuspended by the gas diffused therethrough.

A concentrator 50 is formed between the wall of the tank 10 and the partition structure 20, as shown. An air lift pipe 51 extends through the open top of the concentrator 50 to adjacent its bottom and may be supported from the partition structure 20, as shown. Gas under pressure is injected into the pipe 51 through a gas inlet line 52 leading from a source of compressed gas. The lifted material is withdrawn through a conduit 53 to a regeneration zone, not shown.

The operation of the apparatus will be readily understood. In the chamber 28 a body of liquid undergoing treatment in admixture with ion exchange material is held in suspension and circulation by means of the gas bubbling up from the diffuser 40. In the outer portion of the chamber 28 the suspension moves upwardly due to gas lift action, while in the center, where a vertical upflow of air is prevented, either by the deflector 35 or by blocking of the center portion of the flexible cloth, the suspension moves downwardly by gravity, to be picked up again by the air lift action. This circulation provides a very efficient and prolonged contact between the liquid to be treated and the ion exchange material. The newly entering liquid and treating material are discharged into this circulation and thus quickly mixed with the contents of the chamber 28.

Due to the air lift action of the gas bubbles rising to the liquid surface, the contact time afforded in chamber 28 is further increased by a circulation of a part of the suspension, preferably in excess of the throughput, through the intermediate and upper portions of the partition structure 20, from where it overflows to the space between the upper portion 23 and the partition 25, thence into the outer space of the tank and downwardly to the lower end of the partition structure 20, where it is again picked up by the streams of air bubbles rising from the diffuser 40 and incorporated in the flow pattern in the chamber 28. The rate of this circulation can be controlled by adjusting the sleeve 24. An output portion of treated liquid separates from the downwardly flowing suspension of treating material and overflows into the launder 11, from where it is withdrawn through conduit 12 for use or further treatment in a similar or different manner. Partially spent ion exchange material settles into the concentrator 50 and is conveyed therefrom by air lift continuously or, preferably, at timed intervals, in quantity corresponding to the newly added material, and is regenerated outside the treating apparatus in any suitable manner. A preferred embodiment of regeneration and rinse equipment will be described in connection with FIGURE 2. The regenerated material can then be reintroduced into treating chamber 28.

Pilot plant tests were carried out in a tank 30 inches high and 30 inches in diameter, designed to hold 1½ cubic feet of granular treating material in the treating chamber and for a through flow of 2 gallons per minute, with a total retention time in the tank of 45 minutes. 2 to 3 cubic feet per minute of air was sufficient to keep this quantity of granular material in suspension and circulation, as described above. Under these conditions the recirculation of the slurry of granular material out of the upper portion of the treating chamber and back to the lower part of the treating chamber was about 20 times the through flow. Only an insignificant percentage of the air is needed for air-lift conveying of the material which settles in the concentrator. Attrition of the material was negligible.

If the flexible cloth 45 should become clogged, the three-way valve 48 is positioned to connect casing 41 to the atmosphere. Collapsing of the cloth 45 breaks up any deposits thereon and removes particles that have penetrated into the pores of the cloth, or loosens them sufficiently that they are blown out when the flow of air is resumed.

The plant of FIGURE 2 comprises a series of treatment units or cells A, B, and C and two units D and E for regeneration and rinsing, respectively, of the exhausted exchange material. Each unit is substantially similar to the embodiment of FIGURE 1. While three treating units are shown for purposes of illustration, it will be obvious that any desired number of treating units can be used. Each of the cells A to E has a tank 10 with a launder 11, a partition structure 20, partition 25, concentrator 50, and fill 49, which are substantially the same as shown in FIGURE 1 and will, therefore, not be described in detail in connection with FIGURE 2. While a single air diffuser, as shown in FIGURE 1, can be used also with the units of FIGURE 2, a diffuser system comprising a series of air diffusers is shown for purposes of illustration in FIGURE 2. Such a system is very well suited for larger tanks.

Figure 3:
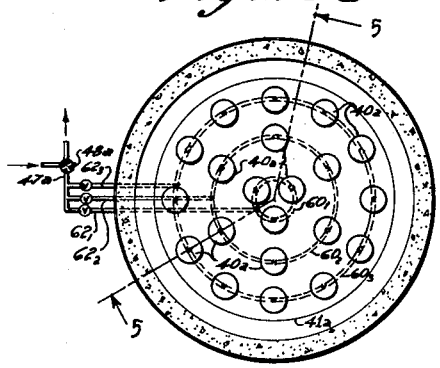
FIGURE 3 is a horizontal sectional view along line 3—3 of FIGURE 2.

As best shown in FIGURE 3, the diffusers $40a$ are arranged in an air diffuser casing $41a$, and are connected in groups to three concentric conduits $60_1$, $60_2$, and $60_3$.

Each conduit 60 receives air under pressure from an air inlet line 47a through a separate valved branch line $62_1$, $62_2$, and $62_3$, respectively. The air inlet line 47a is provided with a three-way valve 48a permitting to selectively connect the diffusers to the source of air under pressure or to atmosphere. By proper positioning of the valves on the three branch lines different quantities of air can be admitted to the groups of diffusers 40a connected to the conduits $60_1$, $60_2$, and $60_3$, respectively. Thus, an air-lift supported flow pattern can be set up, which effects a circulation within the chamber 28a, which may be upwardly in its outer portion and downwardly in the center, or vice versa, depending on whether the larger quantity of gas is applied to the conduit $60_1$ or to the conduit $60_3$. The number of conduits 60 used and of the diffusers connected to each conduit depends on the size of the chamber 28a. The conduits 60 and the diffusers connected thereto should be arranged sufficiently near to each other that air bubbles will rise over substantially the entire area of the chamber 28a.

Figure 4:
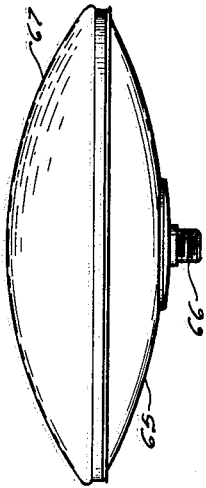
FIGURE 4 is an elevational view, on an enlarged scale, of one of the diffusers of FIGURE 2 during diffusion.
Figure 4A:
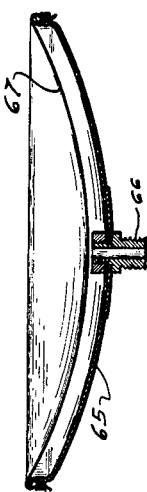
FIGURE 4a is a vertical sectional view of the same diffuser during cleaning.
Figure 5:
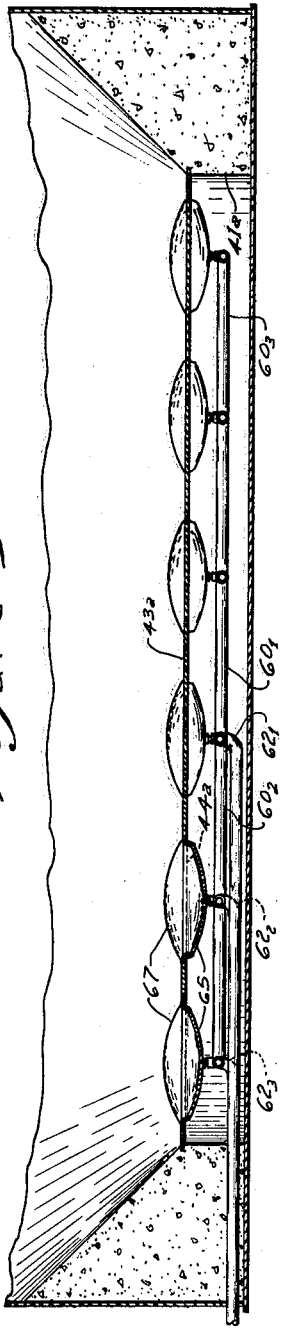
FIGURE 5 is a vertical sectional view, on an enlarged scale, along line 5—5 of FIGURE 3.

The individual diffusers are shown for purposes of illustration as comprising each a relatively shallow impervious cup 65, which is connected to the respective conduit 60 through a restricted nipple 66, and a bonnet 67 of flexible porous material affixed to the cup 65. Instead of the perforations of FIGURE 1, the top 43a of the air diffusion casing 41a has openings 44a for the diffusers and of such size that the upper rims of the diffuser cups 65 fit tightly into the openings, as best shown in FIGURE 5. The bonnet 67 of flexible cloth balloons out above the cup 65 and top 43a under air pressure, as shown in FIGURE 4, and inverts into, and is supported by, the cup, as shown in FIGURE 4a, when the three-way valve 48a is positioned to cut off the air supply and connect the diffusers to atmosphere. This inversion of the bonnet provides an efficient cleaning of the cloth, as described in connection with FIGURE 1.

As in the embodiment of FIGURE 1, the contact time between the treating material and the liquid to be treated is further increased by an air-lift supported circulation leading from the treating chamber 28a, through the upper portion of the partition structure 20 and the outer tank, back into the chamber 28a through its open bottom.

In operation, the liquid to be treated and the ion exchange material flow through the plant of FIGURE 2 countercurrently. The liquid to be treated enters the plant through cell A and flows in sequence through cells B and C. Freshly regenerated ion exchange material is discharged into cell C and from there transferred by air lift sequentially into cells B and A. Thus, the raw liquid is first treated by partially exhausted ion exchange material, and in flowing from cell to cell is contacted with treating material of increasing exchange capacity.

The liquid is introduced into cell A through inlet conduit 30 and is withdrawn from the launder of this cell and introduced into chamber 28a of unit B through a conduit 12a. Similarly, from the launder of cell B liquid is passed through a conduit 12a to the chamber 28a of cell C. Ion exchange material from the concentrator 50 of the respective preceding unit enters chambers 28a of cells B and A, respectively, through conduits 53a by means of air supplied to conduits 51a through air lines 52a.

The ion exchange material from cell A is conveyed by air lift by means of conduits 51a and 53a from the concentrator of this cell to the chamber 28a of regeneration cell D, which is filled with a suspension of exchange material and regenerant. Fresh regenerant solution is introduced into chamber 28a of cell D through conduit 70, and the entering exchange material and regenerant are mixed and circulated with the contents of the chamber in the same manner as described in connection with the treating units. The contact time between regenerant and exchange material is further increased by an air-lift supported circulation out of the chamber 28a and back thereto, as described in connection with the treating units.

Spent regenerant is withdrawn from cell D over a launder 11 and through an outlet conduit 71. Freshly regenerated exchange material is air lifted from the concentrator 50 of cell D to the chamber 28a of cell E.

The chamber 28a of cell E contains a suspension of regenerated treating material and rinse water, which is circulated within the chamber, and from and to the chamber, in the manner described in connection with the other units. Rinse water enters chamber 28a of cell E through conduit 72, and the entering regenerated treating material and rinse water are incorporated in the circulation in chamber 28a. A conduit 73 serves for the withdrawal of rinse water from cell E, while the regenerated ion exchange material, after thorough rinsing in cell E, is air lifted from the concentrator 50 of this cell through conduits 51a and 53a to the chamber 28a of cell C.

It will be seen that the invention provides a plant for continuous ion exchange which provides improved contact between the exchange material and the liquid to be treated. The invention also solves the problem of attrition of the ion exchange material by using air for conveying the material on its forward path through a plural stage plant and for mixing the material with the liquid to be treated or with reagent or rinse water and agitating and circulating the mixture within the individual units of the plant. One of the important advantages of the invention lies in the fact that it permits the treatment of slurries and viscous liquids which cannot be treated in fixed beds, as they clog the beds within a very short time.

Many modifications of the embodiments shown could be made without departing from the spirit and scope of the invention. Thus, the partition structure 20 could be shaped as a frusto-conical hood. The air diffusing means need not be in the shape of flexible diffusers, but could take the form, for example, of diffuser plates forming the top of air diffusion casing 41. It should, therefore, be understood that we do not wish to limit ourselves to the exact structural details shown and described for purposes of illustration and exemplification.

While the invention has been described as applied to ion exchange treatment, the apparatus can be used with advantage to improve the contact between liquids and other granular treating materials customarily used in the form of a bed and requiring gentle manipulation to avoid attrition. An example of such a material is granular activated carbon.

We claim:

1. In a method of regenerating granular ion exchange material, wherein the material is subjected to the action of a regenerant in a first treating zone, the material and regenerant are withdrawn separately from said first treating zone and the material is subjected to rinsing in a second treating zone, the steps comprising maintaining a suspension of ion exchange material undergoing regeneration and regenerant in said first treating zone, diffusing air into said first treating zone to maintain said suspension against settling and effect a circulation of said suspension within said treating zone, introducing ion exchange material to be regenerated and fresh regenerant into the suspension circulating within said first treating zone, separating spent regenerant from said suspension and withdrawing it, withdrawing a portion of said suspension into a quiescent thickening zone, maintaining said second treating zone filled with a suspension of freshly regenerated ion exchange material and rinse water, diffusing air into said second treating zone to maintain the suspension therein against settling and to effect a circulation of the suspension within said second treating zone, ejecting thickened suspension from said thickening zone by means of air under pressure and adding it to the suspension circulating within said second treating zone, adding fresh rinse water to said suspension circulating within said second treating zone, separating used rinse water from said suspension and withdrawing it, withdrawing a portion of said suspention of freshly regenerated ion exchange material and rinse water into a quiescent thickening zone, and ejecting thickened regenerated and rinsed ion exchange material from said last mentioned thickening zone by means of air under pressure and conveying it to a point of use.

2. An ion exchange process of the type wherein slurry to be treated by ion exchange enters a first stage of a series of treatment stages and flows in sequence through the other stages and fresh ion exchange material enters the last treatment stage of the series and is conveyed in sequence through the other stages countercurrently to the slurry to be treated, spent ion exchange material is conveyed from the first treatment stage to a regeneration stage for regeneration therein, and regenerated ion exchange material is returned to the last treatment stage, characterized by maintaining in a tank in each treatment stage a treating zone filled with a suspension of ion exchange material in slurry under treatment of sufficient volume to provide an extended retention time therein, introducing slurry to be treated and ion exchange material into the suspension in the treating zones of said treatment stages, introducing gas into each treating zone of said treating stages to maintain its suspension against sedimentation and provide thorough mixing and contact of said suspension with newly entering slurry and ion exchange material, and an upward flow of a portion of said suspension out of said treating zone through a path leading to the upper portion of said tank, and a return flow to said treating zone, retaining the slurry to be treated in each of said treating zones for a much longer period of time than it is retained in each of said paths, maintaining in a tank in said regeneration stage a treating zone filled with a suspension of ion exchange material in regenerant of sufficient volume to provide an extended retention time therein, introducing fresh regenerant and spent ion exchange material into the suspension in the treating zone of said regeneration stage, introducing gas into the treating zone of said regeneration stage to maintain its suspension against sedimentation and to thoroughly mix and contact it with newly entering spent ion exchange material and fresh regenerant, and to cause an upward flow of a portion of said suspension of ion exchange material and regenerant out of the treating zone of the regeneration stage through a path leading to the upper portion of the tank of said regeneration stage, and a return flow to the treating zone of said regeneration stage, retaining the ion exchange material to be regenerated in the treating zone of said regeneration stage for a much longer period of time than it is retained in the path leading to the upper portion of the regeneration tank, withdrawing from each treatment stage treated slurry from the said return flow of suspension to its treating zone, withdrawing spent regenerant from the return flow in the regeneration stage, withdrawing a portion of the suspension from each treating zone into a quiescent thickening zone in the respective stage, and effecting the conveyance of thickened suspension from stage to stage by ejecting the suspension from said thickening zones by means of gas under pressure.

3. In a plant for carrying out ion exchange operations of the type comprising a series of treating units through which the liquid to be treated flows from one end unit to the other and through which ion exchange material is conveyed countercurrently to the liquid from said other end unit to said one end unit, a regeneration unit connected to said one end unit, and a rinse unit connected to said regeneration unit and said other end unit to establish a closed circuit flow of ion exchange material, and wherein each of said treating units includes inlet means for introducing liquid to be treated and ion exchange material, an outlet for treated liquid, and means for withdrawing ion exchange material; said regeneration unit includes inlet means for introducing partially spent ion exchange material from said one end unit and regenerant, an outlet for spent regenerant, and means for withdrawing regenerated ion exchange material; and said rinse unit includes inlet means for introducing the freshly regenerated ion exchange material from said regenerating unit and rinse water, and means for withdrawing used rinse water and rinsed regenerated exchange material; the combination with each of said units of partition means providing a centrally located treating and circulation chamber free of moving parts in the lower portion of the unit but spaced from its floor, said chamber having an apertured bottom area, and a passageway for flow from the upper portion of said chamber toward the top of said unit and downwardly through the outer portion of said unit and back to said treating and circulation chamber through said apertured bottom area, said treating and circulation chamber being in free hydraulic communication with said passageway; gas diffusion means so arranged underneath said apertured bottom area as to discharge gas bubbles into said chamber, and means preventing an upward flow of gas in the center of said chamber, whereby the gas bubbles discharged into said chamber cause a circulation of its contents within said chamber and an upflow in said passageway, said means for withdrawing ion exchange material from any one unit and introducing it to any subsequent unit including a concentrating chamber, and air lift means for conveying the ion exchange material from said concentrating chamber to the treating and circulation chamber of the subsequent unit, said inlet means to said treating, regeneration and rinse units discharging into the lower portion of the respective treating and circulation chambers.

4. Apparatus for carrying out ion exchange operations, comprising a tank having outlet means for treated liquid and for ion exchange material, partition means in said tank forming therein a treating chamber in the lower portion but spaced from the bottom of the tank, and a passageway leading from an upper portion of said chamber upwardly toward the top of said tank and downwardly, back to a lower portion of said tank, said chamber having an open bottom through which it is in open communication with the underlying portion of the tank and being free of obstructions and moving parts conducive to attrition of granular material and in unrestricted hydraulic communication with said passageway, means for introducing liquid to be treated into a lower portion of said chamber, means for introducing granular ion exchange material into a lower portion of said chamber, gas diffusion means mounted underneath said open bottom, said gas diffusion means being arranged so as to discharge gas bubbles into said chamber, deflecting means centrally arranged in the path of flow of gas from said diffusion means and preventing an upward flow of gas in the center of said chamber, whereby the gas bubbles discharged into said chamber cause a circulation of its contents within said chamber, an upflow in said passageway, and mixing of newly introduced ion exchange material and liquid to be treated with the contents of said chamber, and an inlet line for gas under pressure connected to said gas diffusion means, said gas diffusion means comprising a casing having an impervious peripheral wall extending upwardly from the tank bottom and a perforated top, the cross-sectional area of said casing corresponding approximately to the cross-sectional area of said open bottom, and a diffusion member of flexible porous material affixed to said wall and ballooning out under gas pressure and supported by said top when the gas pressure is cut off.

5. Apparatus for carrying out ion exchange operations, comprising a tank having outlet means for treated liquid and for ion exchange material, partition means in said tank forming therein a treating chamber in the lower portion but spaced from the bottom of the tank, and a passageway leading from an upper portion of said chamber upwardly toward the top of said tank and downwardly, back to a lower portion of said tank, said chamber having an open bottom through which it is in open communication with the underlying portion of the tank and being free of obstructions and moving parts conducive to attrition of granular material and in unrestricted hydraulic communication with said passageway, means for introducing liquid to be treated into a lower portion of said chamber, means for introducing granular ion exchange material into a lower portion of said chamber, gas diffusion means mounted underneath said open bottom, said gas diffusion means being arranged so as to discharge gas bubbles into said chamber, deflecting means centrally arranged in the path of flow of gas from said diffusion means and preventing an upward flow of gas in the center of said chamber, whereby the gas bubbles discharged into said chamber cause a circulation of its contents within said chamber, an upflow in said passageway, and mixing of newly introduced ion exchange material and liquid to be treated with the contents of said chamber, and an inlet line for gas under pressure connected to said gas diffusion means, said gas diffusion means comprising a plurality of concentric gas inlet conduits, a connection from each of said conduits to said inlet line for gas under pressure, a valve on each connection, a plurality of diffuser elements connected to each of said conduits and receiving gas under pressure therefrom, a casing including a peripheral impervious wall surrounding said concentric conduits, and a top having apertures of such size and shape that said diffusers fit tightly thereinto, and valve means on said gas inlet line for selectively connecting said line to a source of gas under pressure or to atmosphere.

6. In a regeneration tank for regenerating ion exchange material, said tank having inlet means for ion exchange material to be regenerated and for regenerant, and outlet means for spent regenerant and regenerated ion exchange material, partition means forming an open bottom treating chamber in the lower portion of said tank and a passageway leading from the upper portion of said treating chamber to an upper portion of said tank and back to the lower portion of said treating chamber, the width of said treating chamber being substantially greater than the width of said passageway, said treating chamber being free of moving parts and in unrestricted communication with said passageway, said inlet means discharging into a lower portion of said treating chamber, and gas diffusion means underlying the open bottom of said treating chamber and effective to mix said regenerant and ion exchange material with the contents of said treating chamber and to circulate a portion of said contents out of said treating chamber through said passageway and back to said treating chamber.

7. Apparatus for treating slurries by ion exchange operations, comprising a tank having outlet means for treated slurry and for ion exchange material, respectively, partition means in said tank forming therein a treating chamber in the lower portion but spaced from the bottom of the tank, and a passageway leading from an upper portion of said chamber upwardly toward the top of said tank and downwardly, back to a lower portion of said tank, the width of said chamber being substantially greater than that of said passageway, said chamber having an open bottom through which it is in open communication with the underlying portion of said tank and being free of obstructions and moving parts conducive to attrition of granular material and in unrestricted hydraulic communication with said passageway, means for introducing slurry to be treated into a lower portion of said chamber, means for introducing granular ion exchange material into a lower portion of said chamber, gas diffusion means mounted underneath said open bottom so as to discharge gas into said chamber to cause mixing of newly introduced ion exchange material and slurry to be treated with the contents of said chamber, and an upflow in said passageway, and an inlet line for gas under pressure connected to said gas diffusion means, said chamber providing sufficient volume for thorough mixing and contacting of slurry and ion exchange material prior to the upflow through said passageway.

References Cited in the file of this patent
UNITED STATES PATENTS

| | | |
|---|---|---|
| 1,608,661 | Nordell | Nov. 30, 1926 |
| 1,671,864 | Higgins | May 29, 1928 |
| 1,707,302 | Godsey | Apr. 2, 1929 |
| 1,759,983 | Houston | May 27, 1930 |
| 1,792,220 | Green | Feb. 10, 1931 |
| 2,365,293 | Robinson | Dec. 19, 1944 |
| 2,528,099 | Wilcox | Oct. 31, 1950 |
| 2,613,181 | Green | Oct. 7, 1952 |
| 2,646,171 | Weiss | July 21, 1953 |
| 2,697,724 | Collier | Dec. 21, 1954 |
| 2,718,275 | Banks | Sept. 20, 1955 |
| 2,721,173 | Lawlor | Oct. 18, 1955 |
| 2,732,330 | Krebs | Jan. 24, 1956 |
| 2,793,753 | Webster | May 28, 1957 |
| 2,963,431 | Dorn et al. | Dec. 6, 1960 |

FOREIGN PATENTS

| | | |
|---|---|---|
| 540,232 | France | Apr. 13, 1922 |
| 290,373 | Germany | Apr. 26, 1914 |
| 34,904 | Denmark | Aug. 24, 1925 |